June 24, 1958 R. A. AMMON 2,840,782
ELECTRICAL METER MOVEMENT
Filed May 3, 1954
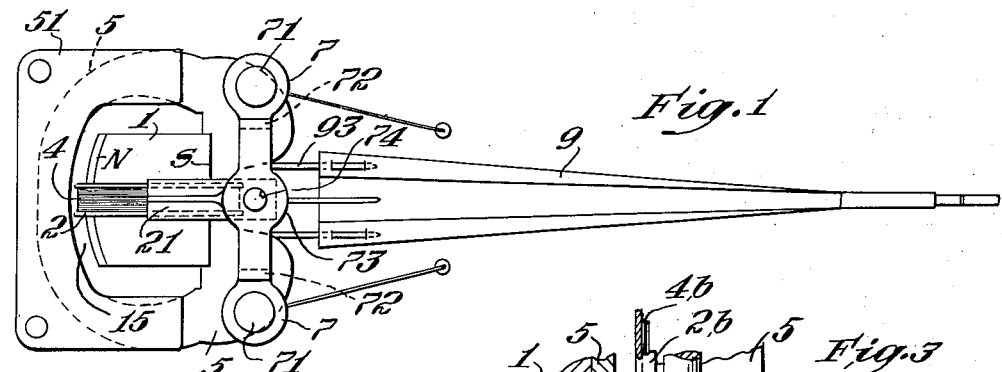
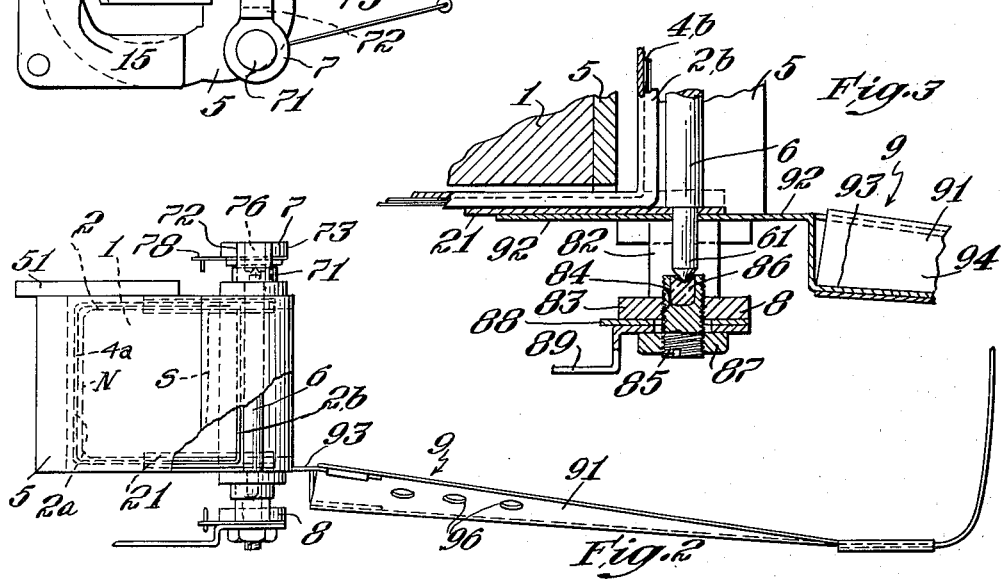
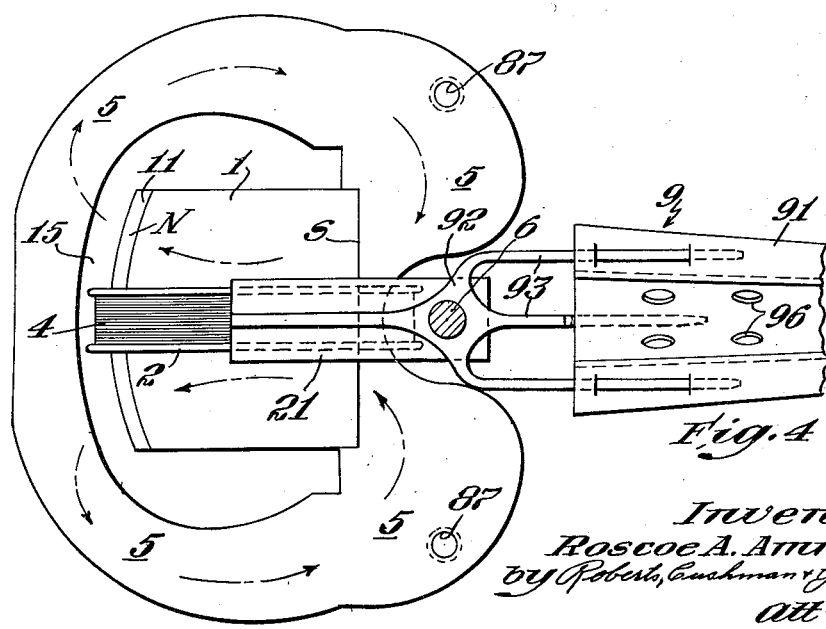
Inventor
Roscoe A. Ammon
by Roberts, Cushman & Grover
Att'ys.

United States Patent Office 2,840,782
Patented June 24, 1958

2,840,782

ELECTRICAL METER MOVEMENT

Roscoe A. Ammon, Manchester, N. H.

Application May 3, 1954, Serial No. 427,328

4 Claims. (Cl. 324—150)

The present invention relates to meters of the D'Arsonval type, particularly to meters having a core magnet and a coil wound on a form and pivoted to swing relative to the core magnet. The object of the present invention is to provide a meter movement which is substantially unaffected by external mechanical accelerating forces and which has a greatly reduced mass and sharply increased torque for a given size of core magnet. A further object is to afford a pivotal support for the coil having an increased bearing radius thereby substantially to reduce the wear on the pivot bearing.

In one aspect the meter comprises a core magnet having two poles on opposite sides of the magnet, as contrasted with a horseshoe magnet, means forming a flux path such as a loop of magnetic material spaced from one of the aforesaid poles to form a single air gap therebetween and joined to the other of the poles, a coil and a supporting form therefor, the coil and form each having an arm extending through the air gap past said one pole, and means pivotally mounting the coil and form beyond the opposite pole of the core magnet, more particularly so that the said one coil and the pivot means straddle the two sides or poles of the core magnet. In the usual construction the coil and form are roughly rectangular in shape and hence each has at least one pair of substantially parallel arms. Preferably these parallel arms are spaced apart a greater distance than the space between the two opposite poles of the core magnet. In certain cases one of the poles has a curved surface, and according to the present invention the radius of the curved surface is greater than the space between the aforesaid poles, and the pivot means are disposed concentrically with the curved surface.

By concentrating the total available magnetic flux in a single air gap, the flux density in that gap is increased approximately two-fold. While the flux density varies inversely with the width of the air gap it has been found that the theoretical increase of the inverse square law cannot be achieved in practice. By placing the pivot at one side of the coil and form, the lever arm of the movement is also increased two-fold; however the total increase in torque produced by the increased flux density and lever arm is not realized for a given size of core magnet, that is for a given spacing between the two poles of the magnet, unless the coil and form are pivoted beyond or outside the pole opposite the air gap through which one arm of the coil and form swing.

Another object of the present invention is to take full advantage of the eddy currents induced in the coil form when the coil and form are swung either intentionally, by passing an electrical current through the coil, or accidentally, by imparting mechanical acceleration to the meter movement. By virtue of the increased torque acting on the coil form by interaction of the eddy currents therein and the magnet field of the air gap, and by minimizing the mass of the coil, form and indicator the acceleration due to external mechanical influence is substantially entirely damped by the torque resulting from the eddy currents so that a meter constructed according to the present invention shows practically no deflection when the meter is shaken or vibrated. Furthermore if the movement swings as a result of electrical current flowing through the coil the eddy currents damp any tendency for the coil to overshoot the deflection proportional to the applied current and effectively prevent the movement from hunting or oscillating about the correct deflection angle.

The increased torque may be utilized to achieve greater sensitivity, or the loading spring associated with the meter movement may be increased in mechanical torque to obtain the same sensitivity as previous meters using the same size of core magnet but affording the greater stability under external acceleration as mentioned above. If a proportionally heavier spring is used to absorb the increased torque made available by the present invention the radius of the bearing contact at the pivotal points of the movement may be increased as much as threefold in comparison with previous meters having the same core magnet size. As is well known in the art an increase in bearing radius produces a great decrease in unit loading of the bearing and a consequent lengthening of the bearing life.

In a further aspect the meter comprises an indicator needle extending from the pivot means in an opposite direction from the arm passing through the air gap, said indicator having a mass substantially entirely balancing said coil and form. While it is contemplated that an extremely small mass of material may be adjustably associated with the pointer for the purpose of compensating for manufacturing errors, the mass of this material will be negligible with respect to the indicator and thus the indicator is said substantially entirely to balance the coil and form.

For the purpose of illustration a typical embodiment of the invention is shown in the accompanying drawings in which:

Fig. 1 is a plan view of the meter movement;

Fig. 2 is a side elevation;

Fig. 3 is an enlarged side elevation, parts being shown in section; and

Fig. 4 is an enlarged bottom view, parts being omitted.

As shown in the drawings the meter comprises a core magnet 1 having two poles N and S, a pivotally mounted coil form 2 on which is wound the usual wire coil 4, a shoe 5 of soft iron forming two loops or flux paths between the poles N and S, top and bottom pivot bridges 7 and 8, and a pointer or indicator needle assembly 9.

For simplicity the shoe 5 forming the flux paths indicated by arrows is shown as one piece extending from the south pole S of the core magnet 1 in two loops to an air gap 15 at the north pole N. In practice this shoe may be made of two or more pieces. A bracket 51 is attached to the shoe 5 and serves to mount the meter in an instrument assembly or panel not shown.

The coil 4 and coil form 2 are generally rectangular in shape, the form having two roughly parallel, vertical form arms 2a and 2b and attached at the upper and lower sides of the coil form 2 are extension plates 21 which extend beyond the arm 2b of the form and carry a pivot staff 6. The pivot staff 6 has at its upper and lower ends conical bearing surfaces 61 which are supported in jewel bearings 76 and 86 carried by the top and bottom bridges 7 and 8 respectively so that the coil and form are pivoted concentrically with a curved face 11 at the pole N.

The top and bottom bridges 7 and 8 are attached to the shoe 5, in the case of the upper bridge 7 by screws 71 at the ends of the bridge. The top bridge has short vertical legs 72 and a raised central portion 73 having a socket 74 in which a jewel bearing 76 is staked. In the case of the bottom bridge 8 legs 82 extend down to a central portion 83 having a threaded portion 84. The bottom jewel 86 is staked in a screw 85 which permits vertical adjustment of the distance between the bearings 76 and 86, and which may be locked in adjusted position by a nut 87. Conventional meter parts such as soldering lugs 78 and 88 and a spring adjusting lever 89 are shown associated with the top and bottom bridges 7 and 8 without further description since they form no part of the present invention.

Attached to the lower extension plate 21 is a folded balancing cross 92 having three prongs 93 which extend to and engage the pointer 9. The pointer 9 has a trough-shaped central portion 91 for rigidity, and one of the prongs 93 is formed with two elbows so as to extend down to the bottom of the inverted trough where it is attached to the trough by welding or soldering. In the usual way a current through the arm 4a of the coil 4 which is in the air gap 15 causes rotation of the coil, form, extension plate and balancing cross and a corresponding deflection of the pointer 9.

According to the present invention the two vertical arms 2a and 2b of the coil form 2 and the corresponding vertical arms 4a and 4b of the coil 4 straddle the core magnet 1, one arm 2a and 4a of each pair of vertical arms lying outside the north pole N of the core magnet and the other of each pair of vertical arms 2b and 4b lying outside the south pole S and outside both of the flux paths formed by the shoe 5. The pivot staff 6 for the coil is located adjacent the coil form arm 2b also beyond the south pole S. Thus, as can be clearly seen in Figs. 1 and 4, the cross-section of the core 1 is not reduced in any plane between the air gap pole N and the opposite pole S joined directly to the shoe 5, that is, there are no openings or cut outs in the core for receiving the coil pivot staff which would reduce the intensity of the magnetic field in the air gap 15. For a given size of core magnet, the moment arm between the vertical arm 4a of the coil and the pivot 6 is doubled. While the corresponding angular deflection is reduced thereby, the concentration of the total available magnetic flux available from the magnet 1 more than compensates for the decrease in angular deflection. In addition the moment imparted to the meter movement consisting of the coil 4, form 2, and pointer 9 by applied current in the coil 4 or eddy current induced in the form 2 is as a final result doubled as compared with center pivoted coils. Thus the overall sensitivity of the movement to applied currents is doubled and also the damping moment of the form is doubled. Consequently the present movement is substantially insensitive or unresponsive to mechanical oscillation produced by external mechanical influences such as jarring or shaking, the eddy current set up in the coil form by any incipient movement being so greatly increased according to the present invention as to prevent the movement substantially entirely.

Furthermore the movement in response to an applied current will deflect to a corresponding position and, because of the damping influence of the increased eddy current moment, reach equilibrium in that position without hunting or oscillating about the position. While the damping moment may reduce the speed with which the needle is deflected it tends to arrest the needle as it reaches the correct deflection angle and hence greatly reduces the total response time.

Advantage may be taken of the previously described increased sensitivity by utilizing the increased deflection, or the increased torque may be used to work against a stronger hair spring. In the latter case the ampere turns/pointer deflection angle relationship is reduced but the still available increased torque permits an increase in the radius of the bearing surface or contact area between the conical ends 61 of the pivot staff and the jewel bearings 76 or 86. As is well known in the art, increasing the bearing radius of a conical bearing increases the contact surface according to the cube law and greatly lengthens the life and durability of the bearing. For example, in a prior art meter using an Alnico core and a center pivoted coil form the available torque was 2.70 millimeter grams and the bearing radius was 0.001 inch for a given ampere turn/angular deflection relation. In contrast, a meter according to the present invention having the same core magnet and sensitivity developed a torque of 6.00 millimeter grams with a bearing radius of 0.003 inch. Experimentally it was determined that the life of the bearing would be increased ten times.

Due to the doubled coil moment arm the life and durability of the bearing is further extended by balancing the pointer 9 against the end pivoted coil and form assembly rather than by using additional counterweighting.

The increased sensitivity and bearing life and the decreased response to external mechanical influences together with the reduction in weight of a meter movement may be achieved by various modifications of the embodiment shown and described herein and it should be understood that the present invention is for the purpose of illustration only and that the invention includes all equivalents which fall within the scope of the appended claims.

I claim:

1. A meter movement comprising a core magnet having two opposite poles defining a magnetic axis, a body of magnetic material spaced from one of said poles to form a single air gap therebetween, said core having a cross-sectional area normal to said axis substantially uniform between said air gap and the opposite pole, said body being joined to the other of said poles to form a flux path between said poles, said body extending from one side of said air gap to the other side of a plane through said air gap, a rectangular coil having a side extending through said air gap, and means pivotally mounting said coil on an axis at the opposite side of the coil and at the opposite end of said core from said air gap.

2. A meter movement comprising a core magnet having two opposite poles defining a magnetic axis, a body of magnetic material spaced from one of said poles to form a single air gap therebetween, said core having a cross-sectional area normal to said axis substantially uniform between said air gap, and the opposite pole, said body being joined to the other of said poles to form a flux path between said poles, said body extending from one side of said air gap to the other side of a plane through said air gap, a rectangular coil having a side extending through said air gap, and means pivotally mounting said coil on an axis at the opposite side of the coil and at the opposite end of the core from said air gap, said side and pivot means straddling the core magnet between said poles.

3. A meter movement comprising a core magnet having two opposite poles defining a magnetic axis, a body of magnetic material spaced from one of said poles to form a single air gap therebetween, said core having a cross-sectional area normal to said axis substantially uniform between said air gap and the opposite pole, said body being joined to the other of said poles to form a flux path between said poles, said body extending from one side of said air gap to the other side of a plane through said air gap, a rectangular coil having a side extending through said air gap, and means pivotally mounting said coil on an axis at the opposite side of the coil and at the opposite end of the core from said air gap, said gap having a curvature whose radius is greater than the distance between said air gap and said pivot means.

4. A meter movement comprising a core magnet having two opposite poles defining a magnetic axis, a body of magnetic material spaced from one of said poles to form a single air gap therebetween, said core having a cross-sectional area normal to said axis substantially uniform between said air gap and the opposite pole, said body being joined to the other of said poles to form a flux path between said poles, said body extending from one side of said air gap to the other side of a plane through said air gap, a rectangular coil having a side extending through said air gap, and means pivotally mounting said coil on an axis at the opposite side of the coil and at the opposite end of the core from said air gap, and outside said return path formed by said body.

References Cited in the file of this patent

UNITED STATES PATENTS

| | | |
|---|---|---|
| 644,917 | Hoyt | Mar. 6, 1900 |
| 1,847,936 | Faus | Mar. 1, 1932 |
| 2,422,714 | Bigelow | June 24, 1947 |
| 2,607,812 | Lederer | Aug. 19, 1952 |

FOREIGN PATENTS

| | | |
|---|---|---|
| 787,424 | France | Sept. 23, 1935 |